US008481971B2

(12) United States Patent
Kim

(10) Patent No.: US 8,481,971 B2
(45) Date of Patent: Jul. 9, 2013

(54) WATER DISPENSERS

(75) Inventor: Colonel Kim, Qingdao (CN)

(73) Assignee: Waterlogic International Limited, Nassau (BS)

( * ) Notice: Subject to any disclaimer, the term of this patent is extended or adjusted under 35 U.S.C. 154(b) by 169 days.

(21) Appl. No.: 12/812,591

(22) PCT Filed: Jan. 15, 2009

(86) PCT No.: PCT/GB2009/000100
§ 371 (c)(1),
(2), (4) Date: Jul. 12, 2010

(87) PCT Pub. No.: WO2009/090385
PCT Pub. Date: Jul. 23, 2009

(65) Prior Publication Data
US 2010/0282657 A1    Nov. 11, 2010

(30) Foreign Application Priority Data

Jan. 15, 2008 (GB) .................................. 0800650.4
Jan. 31, 2008 (GB) .................................. 0801759.2

(51) Int. Cl.
*A61L 2/00* (2006.01)
(52) U.S. Cl.
USPC .................. 250/455.11; 250/428; 250/432 R; 250/434; 250/435; 250/436; 250/437; 250/453.11; 422/22; 422/23; 422/24

(58) Field of Classification Search
USPC ............. 250/428, 432 R, 434, 435, 436, 437, 250/435.11, 455.11; 422/22, 23, 24
See application file for complete search history.

(56) References Cited

U.S. PATENT DOCUMENTS

2002/0046569 A1*    4/2002    Faqih .............................. 62/188
2007/0129265 A1*    6/2007    Ito et al. ........................ 508/313
2007/0163934 A1*    7/2007    Kim et al. ..................... 210/192

FOREIGN PATENT DOCUMENTS

| EP | 1 440 941 A1 | 7/2004 |
| WO | WO 03/045835 A1 | 6/2003 |
| WO | WO 2004/071965 A1 | 8/2004 |

OTHER PUBLICATIONS

International Search Report, dated Apr. 21, 2009, corresponding to PCT/GB2009/000100.

* cited by examiner

*Primary Examiner* — Nicole Ippolito
(74) *Attorney, Agent, or Firm* — Christie, Parker & Hale, LLP

(57) ABSTRACT

A water dispensing apparatus, comprising an input for water; a tank provided with means for chilling water; a UV lamp; a UV transmissive coil wrapped at least partially around the lamp such that the water to be dispensed passes through the coil and is thereby sterilized by the UV lamp to Class A UV standards and an output. A single Class A UV source can be used to sterilize both still and carbonated (sparkling) water, or chilled and ambient water, or all three.

13 Claims, 11 Drawing Sheets

WATER DISPENSERS

CROSS-REFERENCE TO RELATED APPLICATION

This application is a National Phase patent application and claims the priority to and the benefit of International Application Number PCT/GB2009/000100, filed on Jan. 15, 2009, which claims priority to and the benefit of British Patent Application Number 0800650.4, filed on Jan. 15, 2008, and British Patent Application Number 0801759.2, filed on Jan. 31, 2008.

This invention relates to water dispensers. In particular, it relates to water dispensers of a type commonly used in work places and other environments for dispensing cupfuls or other containerfuls of water or other fluids. In this specification, where the term 'water' is used this may be other types of fluids.

Usually the dispensers provide chilled water although they may be adapted to provide ambient water as well and quite often they are required to provide sparkling water in addition to cooled and/or ambient water.

Sterilisation of water is very important in such dispensers in order to ensure that the dispensed product is potable. UV radiation is commonly used to sterilise the water in such dispensers. There are two standards of UV sterilisation. Class B sterilisation is appropriate for most uses and provides potable water of a sufficient standard which will not cause ill-effects to a consumer. Class A UV is a higher standard and there is a move towards requiring Class A UV. With presently available dispensers, it is difficult to achieve Class A UV ratings. The ratings are determined according to NSF/ANSI Standard 55-2004. The Standard is incorporated herein by reference and is widely available. The Standard covers ultraviolet microbiological water treatment systems and components for point-of-use and point-of-entry applications.

Furthermore, when a source of sparkling water is provided, previously proposed dispensers are generally required to use two separate sources, one for dispensing still water and a second including a pump and means for mixing carbon dioxide with water so as to carbonate the water and therefore produce sparkling water. The use of two reservoirs and mechanisms increases the size and complexity of the dispenser.

It is an object of the present invention to provide an improved water dispenser.

In a first aspect, the invention provided water dispensing apparatus, comprising a tank and a common UV sterilising apparatus, wherein the apparatus is such that both chilled water and at least one of substantially ambient temperature water and sparkling water are dispensed by the apparatus after sterilisation by the common sterilising apparatus.

The apparatus may be adapted to dispense, selectively, chilled, sparkling and ambient temperature water.

The apparatus enables, if desired, the water to be sterilised to Class A standards.

According to the present invention there is provided a water dispensing apparatus, comprising an input for water; a tank provided with means for chilling water; a UV lamp; a UV transmissive coil wrapped at least partially around the lamp such that the water to be dispensed passes through the coil and is thereby sterilised by the UV lamp and an output.

In a preferred embodiment, the apparatus is arranged such that liquid to be dispensed and which is to be chilled passes first into a pipe which mounted within the tank and is therefore acted upon by the chilling apparatus, and from then into the main tank then to the UV transmissive coil and finally to a dispensing point, whereas liquid which is to be dispensed substantially unchilled is applied directly through the UV transmissive coil and from there to the outlet.

The pipe into which the liquid passes is most preferably heat conductive, typically of metal such as stainless steel.

The UV transmissive coil is preferably of quartz.

In a modification used for dispensing still and/or sparkling (carbonated) water, the apparatus is such that after passing through the UV transmissive coil and being sterilised, still water is passed direct to an outlet whereas water to be carbonated is passed, via a pump, into the main tank, the tank including means for incorporating carbon dioxide with the water to thereby generate carbonated water, and an outlet for the carbonated water.

Thus, in this embodiment, the tank is filled with carbonated water and this is therefore used as a chilling medium for chilling the still water.

The tank may include a level detector and means for pressurising the water, such that its pressure exceeds that of the applied $CO_2$.

Thus, in these embodiments of the invention, the carbonated water is used as the cooling bath in which the non-carbonated water is dispensed via.

In a further aspect, the invention provides dispensing apparatus comprising any one or more of the novel features or combinations of features disclosed herein.

Embodiments of the invention will now be described, by way of example only, with reference to the accompanying drawings, in which.

Figure 1:
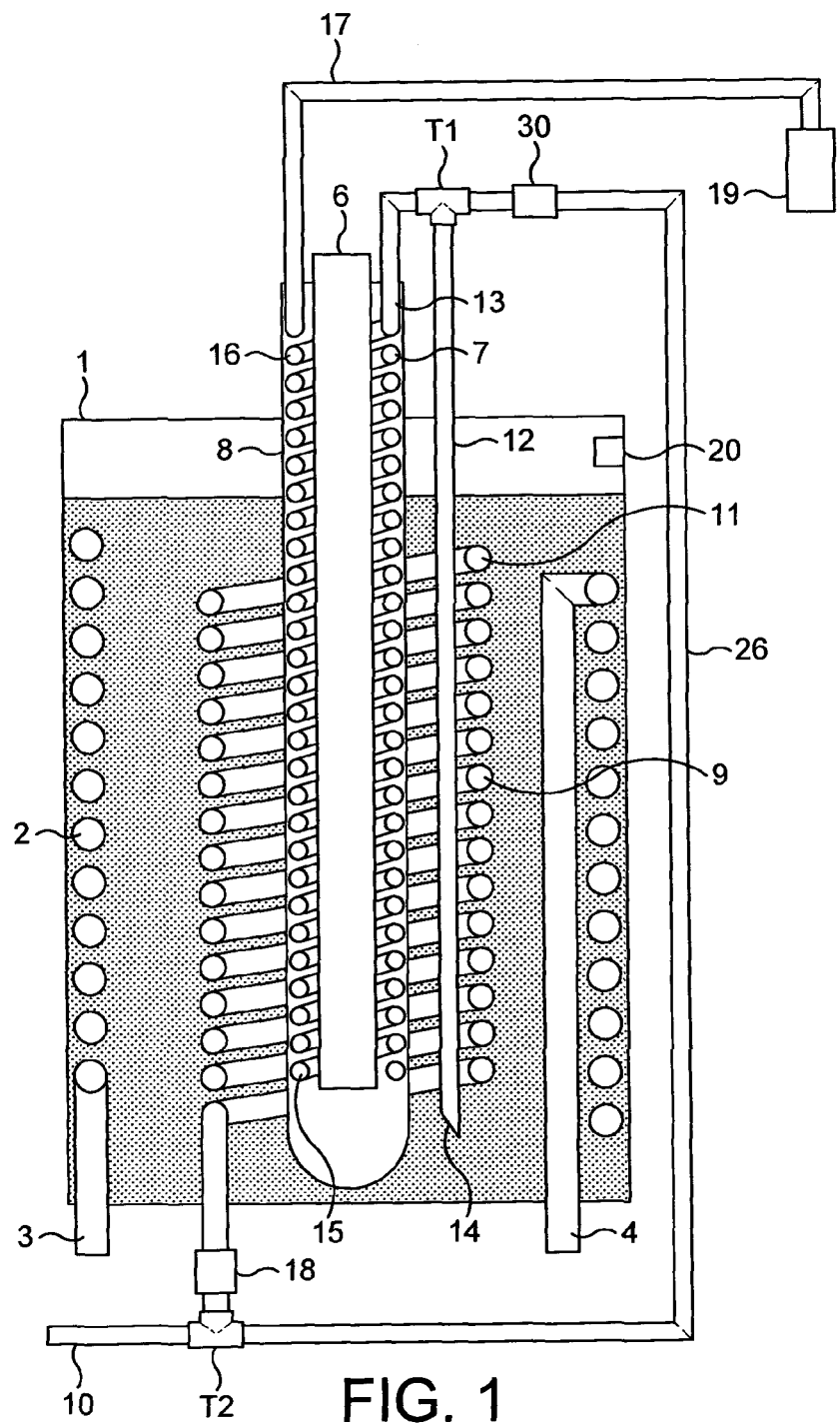
FIG. 1 shows a dispenser for dispensing cooled sterilised water.

Referring now to FIG. 1, a dispenser includes a tank 1 within which is mounted a cooling coil 2. The cooling coil is provided with coolant fluid through an inlet 3 which then passes upwards through the coil to and outwards through an outlet 4. This may be any convenient type of cooling fluid which may be cooled by any convenient method. The cooling coil 2 is, as shown, mounted in contact with the inner wall 5 of the tank 1 and the tank may be made of metal, plastics, or other material. Within the tank 1 there is mounted an assembly comprising a UV lamp (typically an 11 W lamp) of the type which is commonly available and which is intended for producing UV energy to sterilise materials. A tube 7 which is preferably of quartz but might be of other material, such as other glass-type materials or other materials, which is transmissive to UV radiation, is wrapped tightly around the UV lamp 6 and in sufficient proximity to allow purification of cold water as it flows through, or as it stands, to Class A standard. Note that the UV lamp will of course be powered and the electrical connections then power/control circuitry, this is not shown for clarity. The UV lamp/quartz tube assembly is then enveloped within an outer quartz sleeve 8.

A stainless steel or other tube, preferably metallic, is mounted within the tank generally surrounding but spaced apart from the UV lamp/quartz tube assembly and this is shown at 9. Water, or other beverage, to be dispensed is admitted into the stainless tube 9 from the inlet 10 and passes through a T piece $T_1$ and a solenoid 18. It then passes upwards through the stainless tube and the tube is open at its top end 11 so that water, after passing through this tube, then passes directly into the vessel defined by tank 1, towards the top end of the tank.

A connecting tube 12 is used to direct water (or other beverage) from an inlet 14 towards the bottom of the tank 1 to one end of a quartz tube 7 via a further T piece T2. Tube 12 passes inside the coil 9. As is shown in the FIG. 1, the quartz tube is actually double wound. That is, from end 13, which is mounted towards the top of UV lamp 6, the tube spirals down to a lower coil 15 and from then spirals upwards, interleaved with the downward part of the spiral to the other end 16. An outlet pipe 17 receives fluid from end 16 and passes the fluid to an outlet 19 such as a faucet or tap for dispensing via a consumer into a cup, or other drinking or storage vessel.

Thus, in use, the system is initially primed by admitting water via inlet 10 which then flows through steel tube 11 and then fills the tank 1. A level sensor 20 is shown schematically and this may be used to close the inlet 10 when the tank is full and to cause the tank to be refilled as water is dispensed. Water is passed from the lower end of tube 13 into the top of quartz tube 7 and passes all the way through quartz tube 7 to its end 6 from where it is passed into outlet pipe 17 and then either allowed to pass or not by the solenoid 18.

Figure 2:
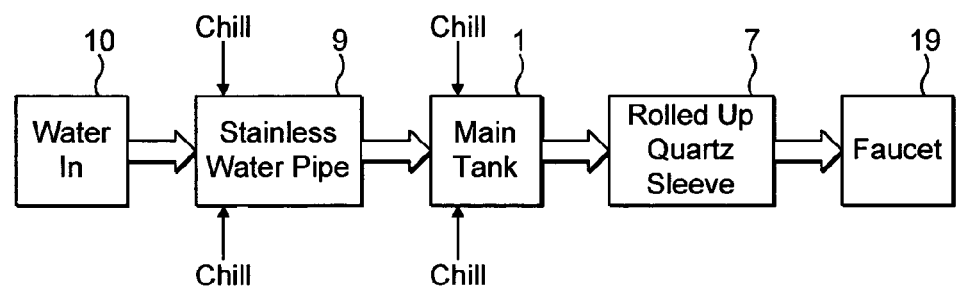
FIG. 2 shows a flow chart relating to the FIG. 1.

This flow is shown schematically in the flow chart of FIG. 2.

Cooling fluid is also applied to cooling tube 2 to chill the water within the main tank and also, since it sits within it, within the stainless pipe. The stainless steel pipe therefore acts as a pre-chill and also stop incoming warm water mixing as it enters the tank. This improves water cooling efficiency over a system which inputs water directly into the tank from a mains supply. Thus, as the water passes initially through still tank 9 it begins to be chilled by virtue of the cooling coils 9, fed by a cooling fluid, chilling the water in the main tank and the water in the main tank serving to chill the water within the stainless steel or other pipes. The material of the pipe 9 is chosen to be a good conductor so that it is heat transmissive to enable fluid passing within this to be cooled by the cooled water outside the tube.

When it leaves tube 9, the water is already partially cooled. It then enters the tank 1 where it is cooled further. Typically, if the ambient temperature is, say, 25° C. then in the tank, after the initial pre-chill, the water may be cooled down to about, say, 3° C. to 8° C. This is considered to be a pleasant temperature for drinking water at by most people. The pipe 12, having its inlet 13 towards to bottom of tank, receives this chilled water and passes this into the quartz tube 8. This is wrapped tightly around the UV lamp and therefore receives UV radiation from the lamp. The tube, with its double wrapped structure, is of sufficient length, and is sufficiently close to the UV tube that water passes through it for a sufficient time that it is completely sterilised to Class A UV standards. Note also that the water within the tank 1 is also subject to sterilisation from the UV lamp 6, passing through the quartz tube, although the greater the distance the water from the tube, the less the sterilising effect has the effect of cause decreases with range. The sterilised and chilled water is output from the top of the tube at 16 and held within outlet tube 17. When a user wishes to dispense water, the chilled, sterilised water is output through faucet 19.

Figure 3:
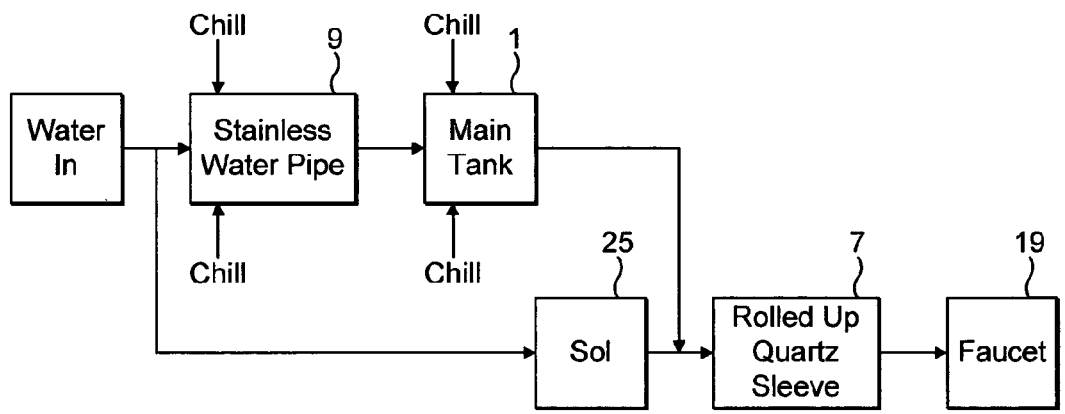
FIG. 3 shows a flow chart for dispensing cooled and ambient water from the apparatus of FIG. 1.

The same apparatus may be used to offer the user a choice of cooled or ambient temperature water. In effect, because of the nature of the apparatus, the ambient water might in fact, when dispensed, be a little cooler than it would have been if water was simply dispensed from the mains system. FIG. 3 also shows schematically how this aspect can be achieved. As shown in the figure, in a system which can dispense both chilled and ambient water, water is applied both to the stainless steel water pipe 9 and, alternatively, it is applied directly into the quartz sleeve 7. This is done via tube 26 which connects to T pieces $T_1$ and $T_2$. By activating a solenoid 30 water flows through tube 26. Thus, by operating solenoids 18 and 30 is synchronism, a user can select 'chilled' water (which pass through pre-chill coil 9, into the tank then sterilising coil 7, or 'ambient water' which passes direct to steriliser 7. This is shown in dashed lines in FIG. 3 where mains water is applied into a switching component 30 which can be actuated, perhaps in synchronism with solenoid (or other sterilising element) 18, so that a user can choose whether to have chilled water, which is therefore passed first into the stainless tube 9, from there into the tank and from there into the quartz tube 7, or alternatively whether he wants ambient water which is then passed directly, through tube 26, into the quartz tube 7. Switches 30, 18 may be solenoids. If ambient water is required, the stainless steel tube and tank are therefore bypassed and so any cooling, if at all, happens only within the quartz tube. In practice, a small degree of cooling will probably occur within the quartz tube since this lies within the cooled water within the tank but the water output from the faucet if it has by passed the stainless steel tube and tank itself, will be significantly warmer (nearer ambient) than the cooled water.

In practice then, for ambient water, water is applied directly into the quartz tube where it sterilised and from where it can be dispensed. Where cool water is required, then the water first passes into the stainless steel coil which empties into the tank. The tank then feeds the quartz coil which purifies (sterilises) the water and it flows around the quartz coil on its way to dispense.

The invention is of course most applicable to office type water dispensers.

Figure 4:
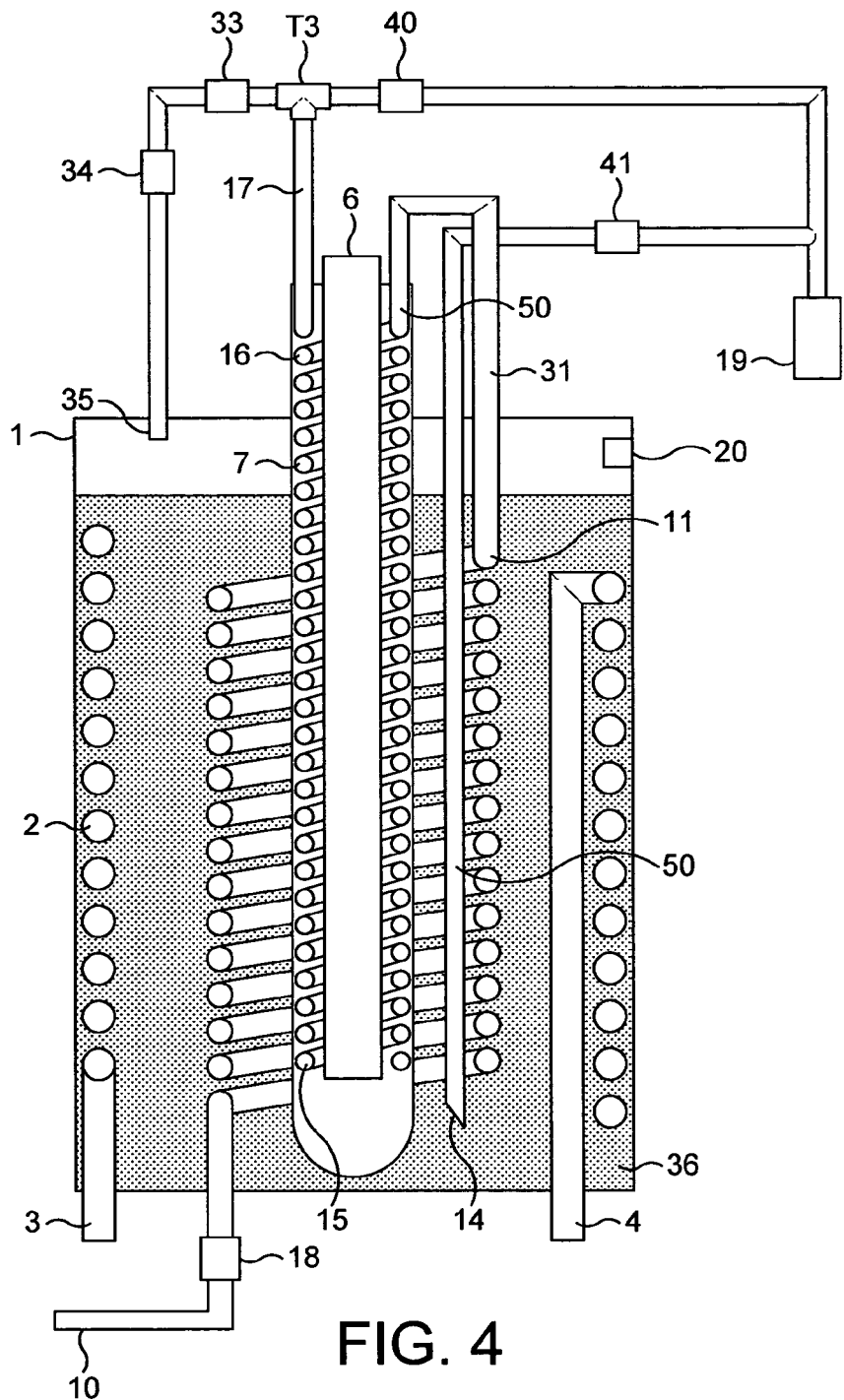
FIG. 4 shows an apparatus for dispensing selectively cooled or carbonated beverage.

Sometimes, it is required to be able to dispense sparkling (carbonated) water in addition to non-carbonated water. FIG. 4 shows a modified apparatus which can achieve this. Equivalent components to the components of FIG. 1 have equivalent numbers in this figure.

In this embodiment, the still water is directed into the stainless steel tube where it is cooled by water within the tank as before. However, the tank is then not filled by water output from the stainless steel tube but is instead filled as described further below. As the water passes through the stainless steel tube, it is cooled by the water within the tank 1 which is itself cooled by the cooling coil 2. When the water leaves the stainless tube at end 11, and is thereby cooled, instead of it being passed into the tank, it passes through a tube 31 directly to the input 50 of the quartz tube 7. The water then passes throughout the length of the quartz tube wrapped around the UV lamp and is sterilised to Class A UV standards by this. When it reaches the end 16 of the double wrapped quartz tube, the water then leaves through tube 17 and can be dispensed.

However, in this case, before dispensing, the water passes through to a T-junction $T_3$ from here it can either go or pass to a further solenoid 33 which, if enabled, can cause the water from the quartz tube 7 to flow, optionally via a pump 34, typically at a pressure of 65 psi, directly into the tank 1 via nozzle 35. Solenoid 33 may be linked to a level sensor 20 so that if water in the tank has not reached the level of level sensor either solenoid is opened to allow water to pass through pump 34 and to fill the tank but when the level sensor is actuated the solenoid closes it flow path. The water in the tank 1 then acts as the cooling medium for water in the stainless tube 9.

An inlet for a source of carbonation 36 is schematically shows and is also mounted within the tank 1. This enables carbon dioxide from a source (not shown) to be pumped directly into the water held within the tank 1, typically at a pressure of 45 psi, to thereby carbonate this. The relative pressures of the water in the tank and the gas (usually carbon dioxide) pumped into it are such as to enable the gas to carbonate the beverage in known manner. Typically, the water will be higher pressure than the $CO_2$. The $CO_2$ will usually be put in the tank first, then the water added. A non-return valve (not shown) is included in the $CO_2$ connection.

Since cold water absorbs more $CO_2$ than ambient water, it is desirable to fill the tank with water from the quartz tube, which has been chilled therein, into the tank.

The tank 1 therefore stores the carbonated water for dispensing and this tank full of carbonated water also acts as the cooling bath for the still water. Because the water within the tank has already been sterilised by being passed through the quartz tube, it is safe for human consumption. Therefore, when a consumer wishes to dispense sparkling water, this water can be dispensed through a separate dispensing system comprising a tube 50 for receiving water from a position 14 towards the bottom of the tank 1 and applying this, via a second dispensing solenoid 41 to faucet 19 (not shown). The outputs from solenoid 18 and solenoid 41 may be applied to the same or different faucets.

Figure 5:
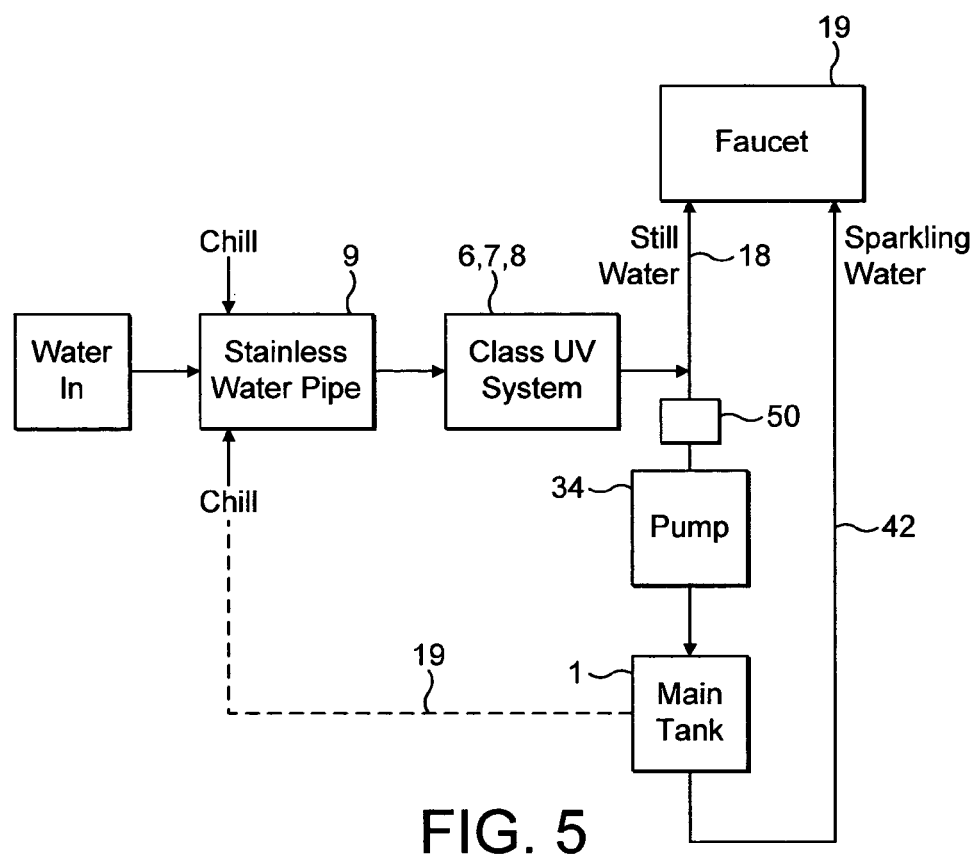
FIG. 5 shows a flow chart of the flow of water through a system as shown in FIG. 4.

FIG. 5 shows more clearly how water passes first through the stainless steel pipe, where it is chilled to the Class A UV system comprising UV lamp 6, quartz tube 7 and quartz sleeve 8. From here, still water is directly dispensed to the faucet 19. Water to be carbonated is alternatively applied through pump 34 to the main tank 1. The main tank 1 is used as part of the chilling system and so a link 1a is shown schematically in dotted lines in the figure. Sparkling water from the main tank, which has already been purified, is then applied via line 42 to the faucet 19. The water applied to the pump 34 may pass through a check valve 50 which is one way valve.

Figure 6:
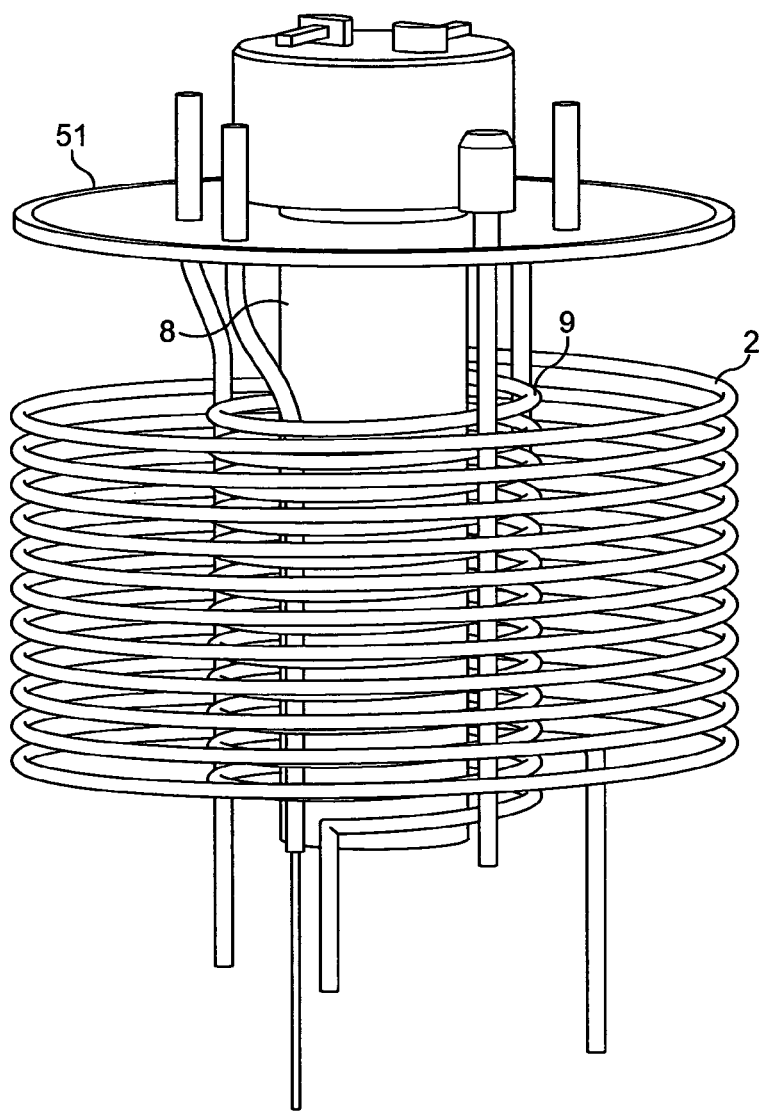
FIG. 6 shows a cooling system.

FIG. 6 shows a water dispenser, with the outer tank 1 removed. This shows more clearly the cooling coil 2, the stainless steel pipe 9 and the outer quartz sleeve 8 of the Class A UV system. The figure also shows various inlet and outlets and show a top plate 51 which mounts the upper tube and the UV cooling assembly. The cooling tank may be mounted to this top plate for example.

Figure 7:
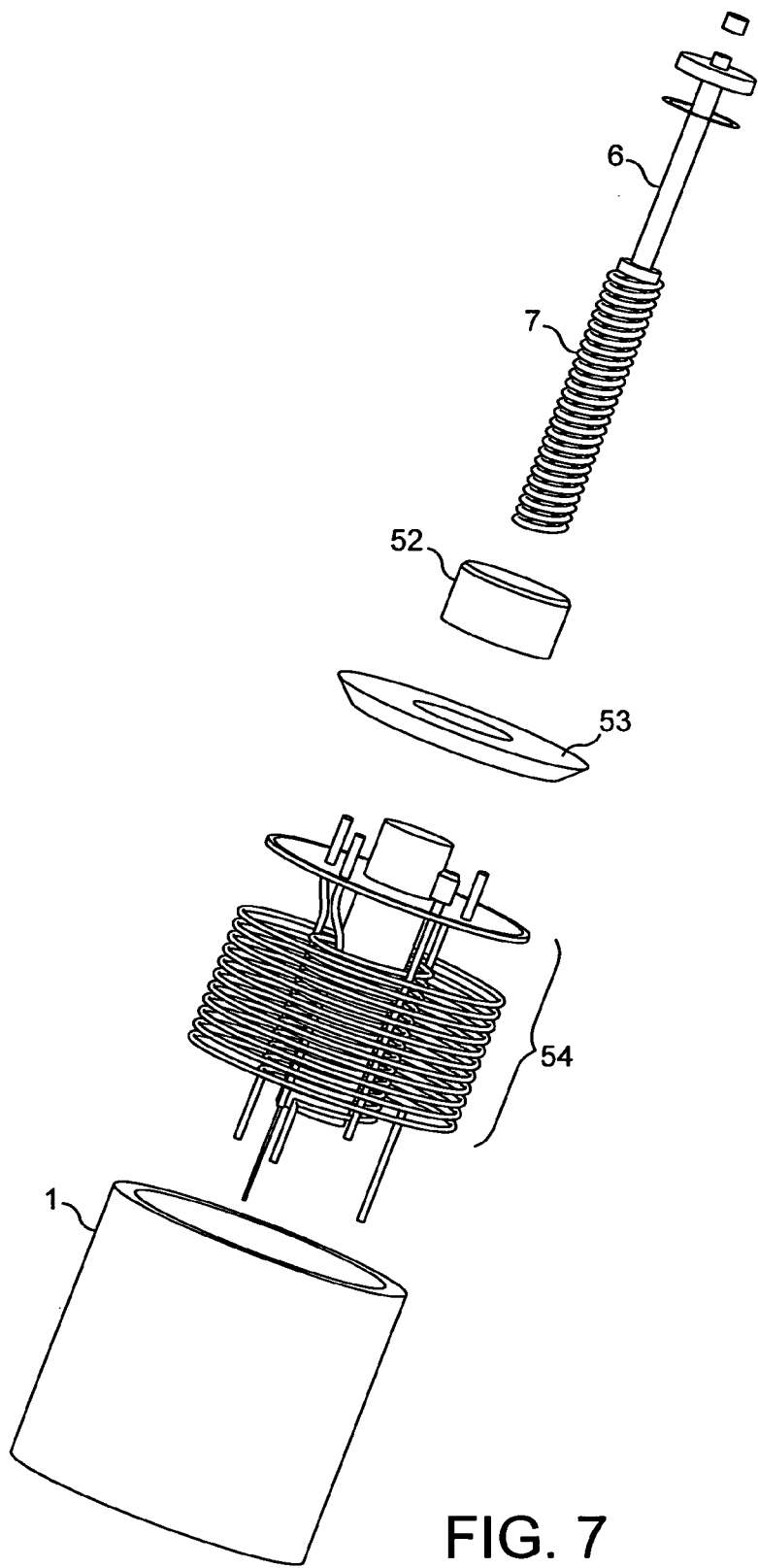
FIG. 7 shows an exploded view of the system of FIG. 6.

FIG. 7 shows an exploded view of the assembly of FIG. 6, and also includes the tank 1. This shows the UV lamp 6, the quartz tube 7, a mounting member 52 and a base member for the UV assembly 53. These are then mounted within a cooling assembly 54 and then all mounted within the tank 1.

The invention provides, amongst other things: The use of one stainless steel cold tank to make still cold water and ambient still water to Class A NSF standard 55. The first point of use machine to Class A purification. The use of one tank to make sparkling water, chilled and ambient still water, incorporating one UV lamp to purify all three types of water. The invention further provides the use of an immersed direct chill pipe within a carbonated tank making cold still water and carbonated water. Also, the invention contemplates the use of an immersed stainless steel refrigeration pipe, a direct chill cold water pipe, a spiral quartz purifier, a UV lamp, and quartz or similar sleeve.

The cooling pipe 2 may be provided inside or outside the tank.

FIGS. 8 to 12 show some embodiments of the invention.

Figure 8:
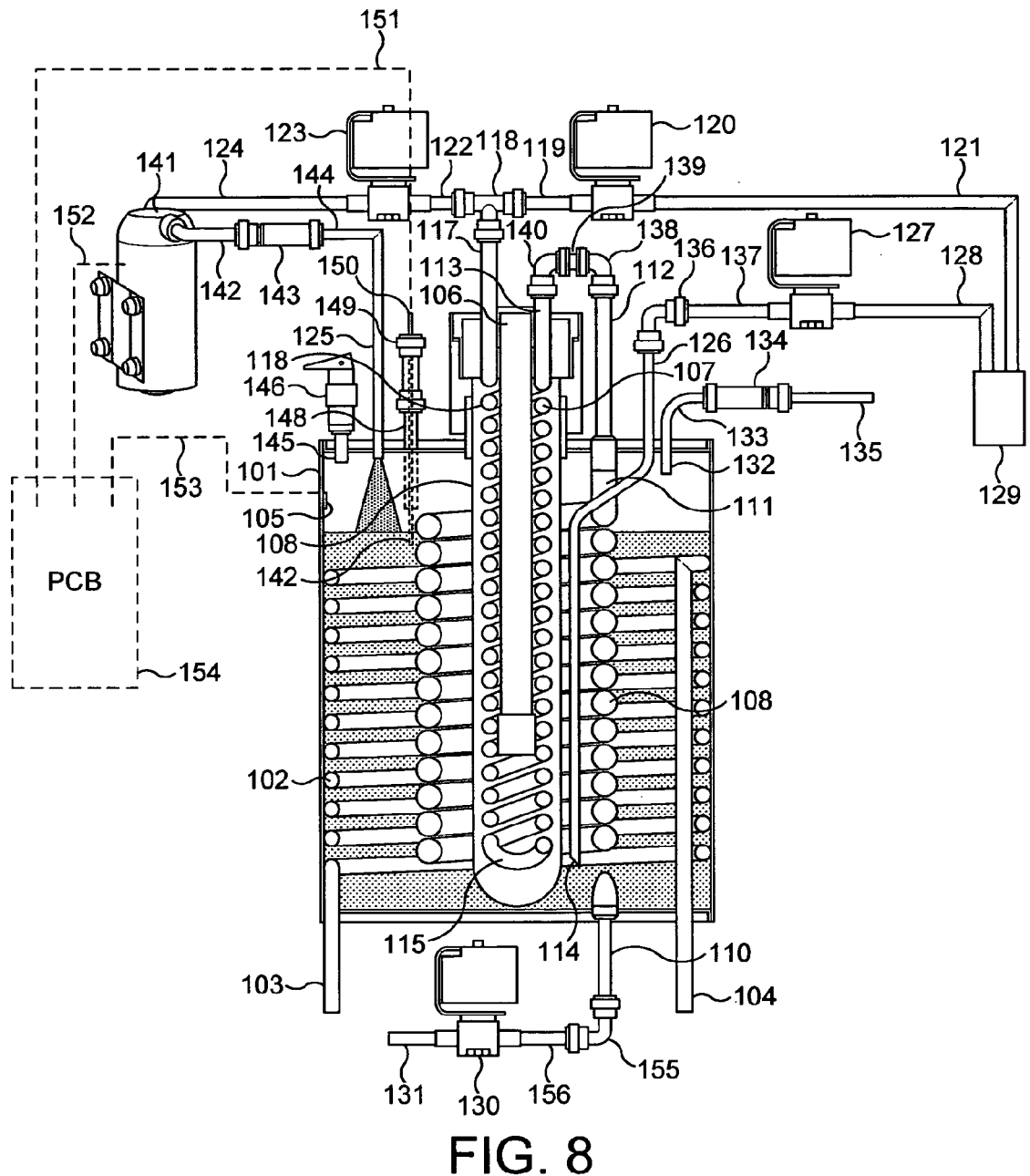
FIG. 8 shows a detailed view of a chilled and sparkling drinks design.

FIG. 8 shows a construction useful for chilled and sparkling water. In this figure, the following components are used:

| Item | Component |
| --- | --- |
| 101 | Main tank |
| 102 | Refrigeration gas flow pipe (cooling pipe) |
| 103 | Inlet of refrigeration gas flow pipe (cooling pipe) |
| 104 | Outlet of refrigeration gas flow pipe (cooling pipe) |
| 105 | Main tank inner wall |
| 106 | UV lamp |
| 107 | Spiraled quartz sleeve inlet |
| 108 | Outer quartz sleeve |
| 109 | Pre-directed chill pipe |
| 110 | Water inlet pipe to pre-direct chill pipe |
| 111 | End pipe of pre-direct chill pipe |
| 112 | Water outlet pipe for pre-direct chill pipe |
| 113 | Water inlet to spiraled quartz sleeve |
| 114 | Water outlet pipe of sparkling water toward a UV |
| 115 | Spiraled quartz sleeve lower coil |
| 116 | Spiraled quartz sleeve outer coil |
| 117 | Pipe between spiraled quartz sleeve to 3 way connector |
| 118 | 3 way connector |
| 119 | Pipe between 3 way connector to cold solenoid valve |
| 120 | Cold water solenoid |
| 121 | Cold water outlet pipe from solenoid valve |
| 122 | Pipe between 3 way connector to sparkling inlet solenoid valve |
| 123 | Water inlet solenoid to sparkling tank (main tank) |
| 124 | Pipe between sparkling inlet solenoid to main tank |
| 125 | Pipe for water inject |
| 126 | Pipe to the sparkling outlet solenoid valve |
| 127 | Pipe to sparkling outlet solenoid valve |
| 128 | Sparkling water outlet pipe from solenoid valve |
| 129 | Faucet |
| 130 | Cold water inlet solenoid valve |
| 131 | Main water inlet |
| 132 | Gas inlet pipe to the main tank |
| 133 | |
| 134 | Non-return valve |
| 135 | Pipe to the gas bottle |
| 136 | Connector (fitting) |
| 137 | Pipe to sparkling outlet solenoid valve |
| 138 | Connector (fitting) |
| 139 | Pipes |
| 140 | Connector (fitting) |
| 141 | Pump |
| 142 | Pipe |
| 143 | Non-return valve |
| 144 | Pipe |
| 145 | Tank outlet connector for safety valve |
| 146 | Safety valve |
| 147 | Water level sensor |
| 148 | Outside pipe |
| 149 | Connector (fitting) |
| 150 | Water level sensor top |
| 151 | Wires between level sensor and PCB |
| 152 | Wires to the pump |
| 153 | Wires to level sensor |
| 154 | PCB |
| 155 | Connector (fitting) |
| 156 | Pipe |

In particular, the components used for cold water dispensing are: 131, 130, 156, 155, 110, 109, 111, 112, 138, 139, 140, 113, 107, 115, 116, 117, 118, 119, 120, 121 and 129.

The components used for sparkling water dispensing are: 131, 130, 156, 155, 110, 109, 111, 112, 138, 139, 140, 113, 107, 115, 116, 117, 118, 122, 123, 124, 141, 142, 143, 144, 125, 114, 126, 136, 137, 127, 128 and 129.

Figure 9:
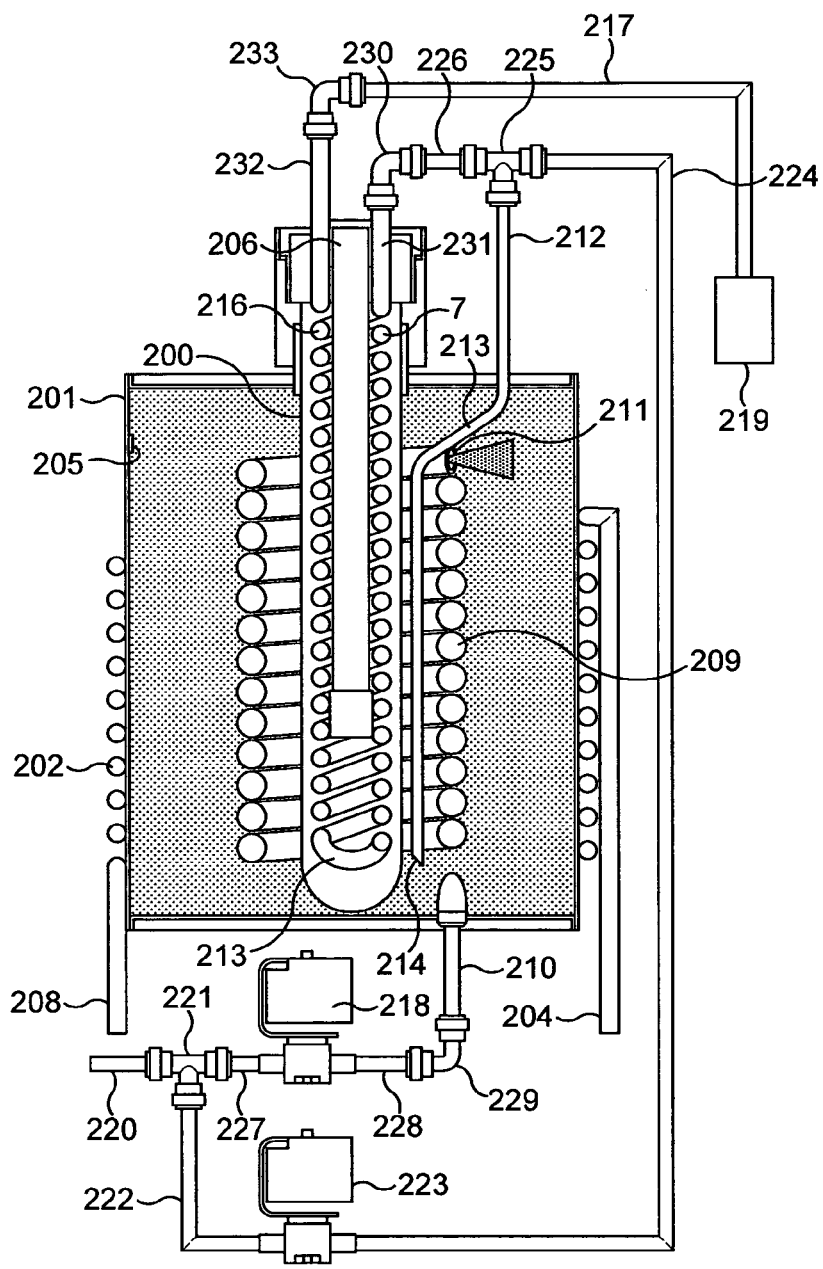
FIG. 9 shows a detailed view of a chilled and ambient tank design, with cooling pipe outside the tank.

FIG. 9 shows a construction useful for chilled and ambient water. In this figure, the following components are used:

| Item | Component |
|---|---|
| 201 | Main tank |
| 202 | Refrigeration gas flow pipe (cooling pipe) |
| 203 | Inlet of refrigeration gas flow pipe (cooling pipe) |
| 204 | Outlet of refrigeration gas flow pipe (cooling pipe) |
| 205 | Main tank inner wall |
| 206 | UV lamp |
| 207 | Spiraled quartz sleeve inlet |
| 208 | Outer quartz sleeve |
| 209 | Pre-direct chill pipe |
| 210 | Water inlet pipe to pre-direct chill pipe |
| 211 | Other end of pre-direct chill pipe |
| 212 | Water pipe to 3 way connector |
| 213 | Water outlet (top) of cold water from the main tank |
| 214 | Water outlet (bottom) of cold water toward UV |
| 215 | Spiraled quartz sleeve lower coil |
| 216 | Spiraled quartz sleeve other outlet |
| 217 | Cold water outlet pipe to faucet |
| 218 | Cold water inlet solenoid valve |
| 219 | Faucet |
| 220 | Main water inlet |
| 221 | 3 way connector |
| 222 | Water pipe to ambient water control solenoid valve |
| 223 | Ambient water control solenoid valve |
| 224 | Pipe between ambient water control solenoid valve and 3 way connector |
| 225 | 3 way connector |
| 226 | Pipe |
| 227 | Pipe |
| 228 | Pipe |
| 229 | Connector (fitting) |
| 230 | Connector (fitting) |
| 231 | Pipe |
| 232 | Pipe |
| 233 | Connector (fitting) |

In particular, the components used for chilled water are: 220, 221, 227, 218, 228, 229, 210, 209, 211, 214, 213, 212, 225, 226, 230, 231, 207, 215, 216, 232, 233, 217 and 219.

The components used for ambient water are: 220, 221, 222, 223, 224, 225, 226, 230, 231, 207, 215, 216, 232, 233, 217 and 219.

Note that in the embodiment of FIG. 9, the coolant pipe 204 is provided outside the tank. This can be done with any embodiment.

Figure 10:
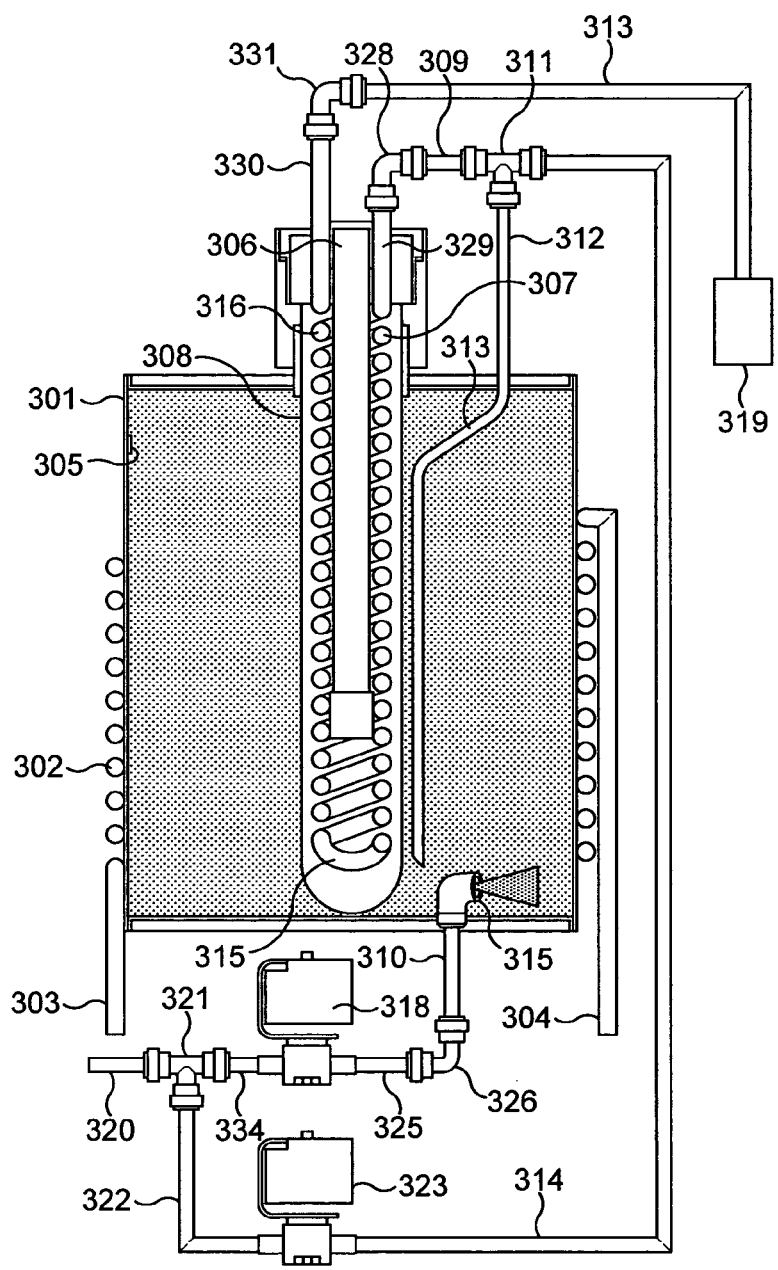
FIG. 10 shows a detailed view of a chilled and ambient tank design without pre-chill and with cooling pipe outside the tank.
Figure 11:
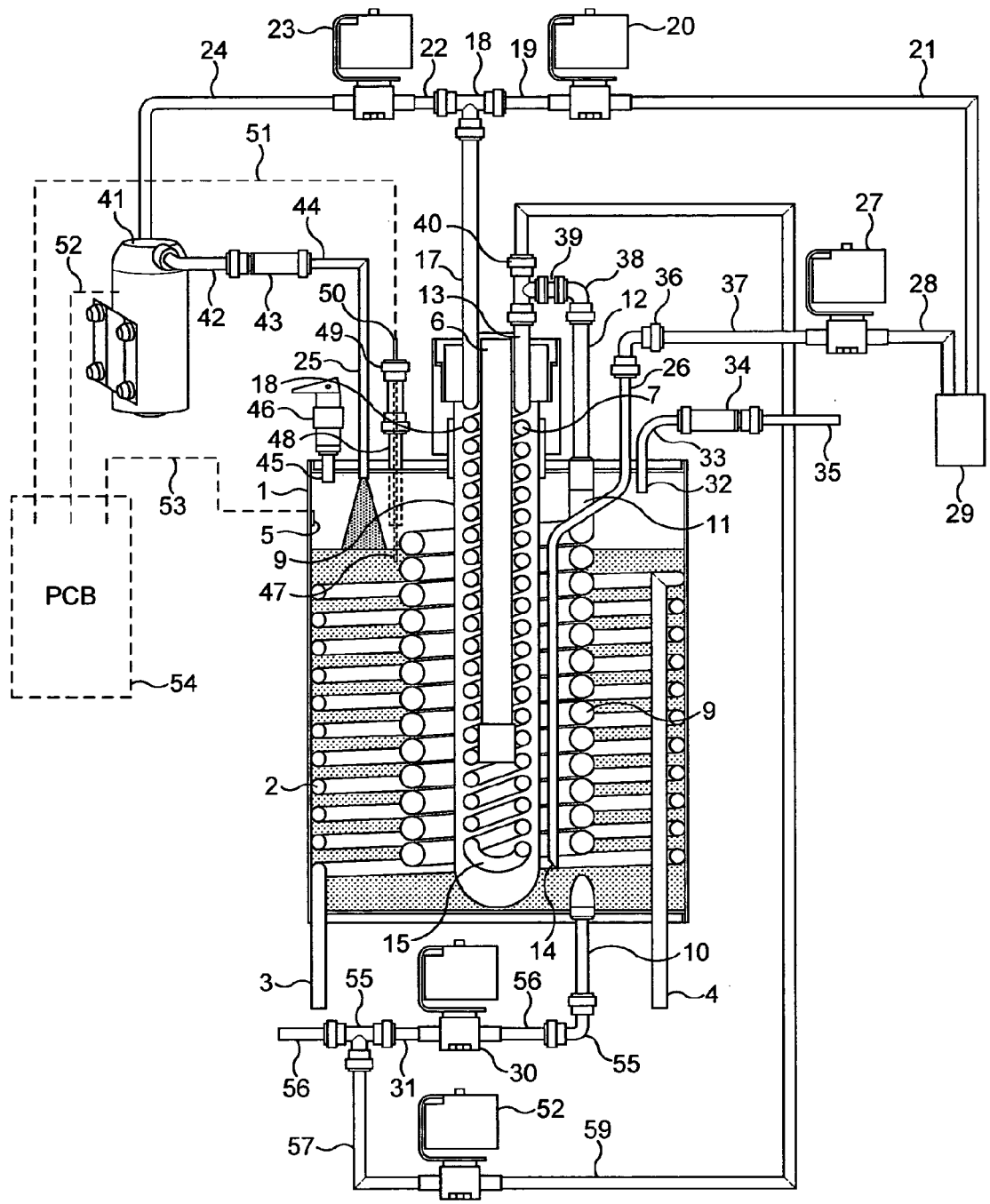
FIG. 11 shows a tank for dispensing chilled, ambient and sparkling water, with cooling pipe inside the tank.
Figure 12:
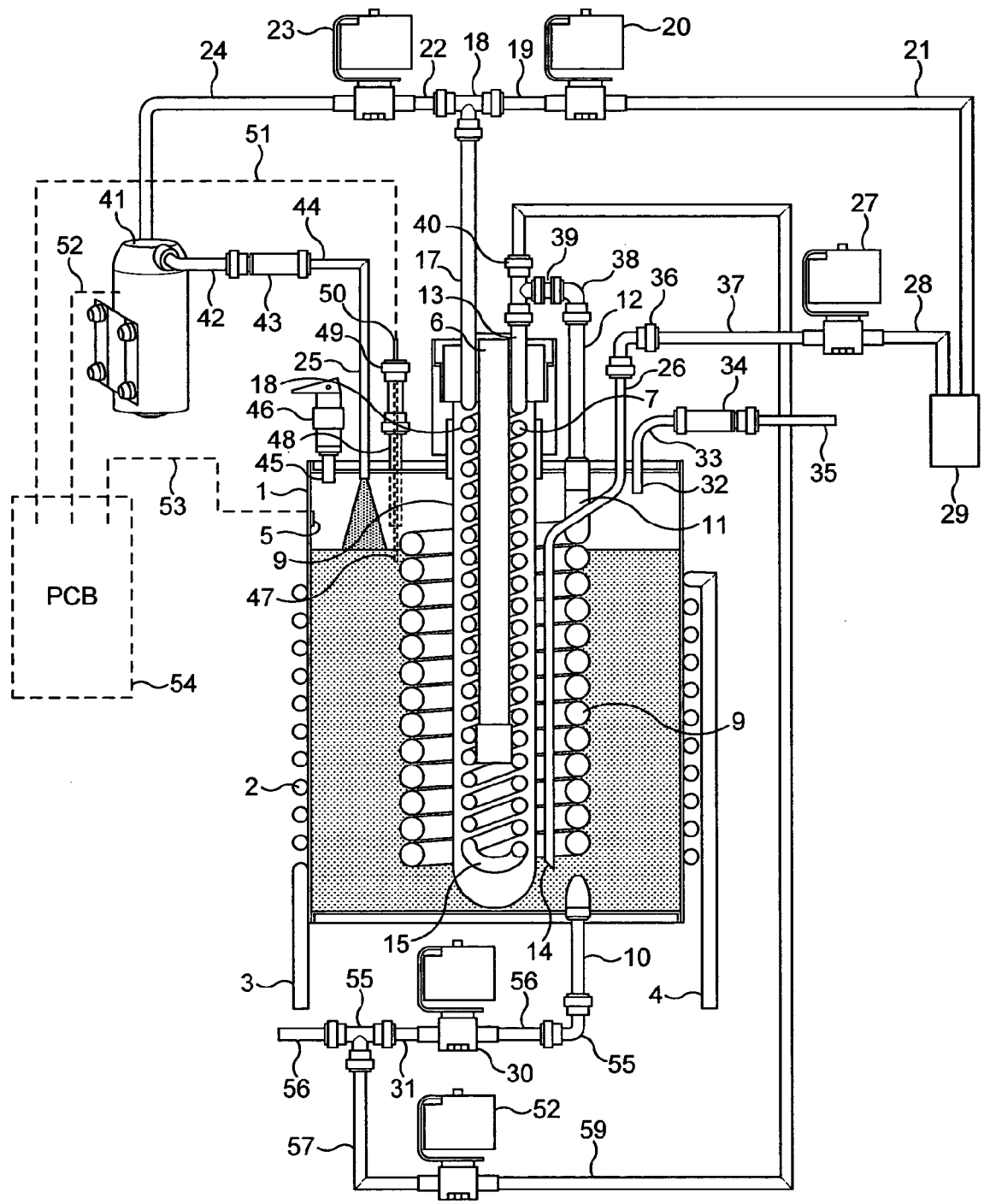
FIG. 12 shows a tank for dispensing chilled, ambient and sparkling water, with cooling pipe outside the tank.

FIG. 10 shows an embodiment for chilled and ambient water, without a pre-chill pipe. Again, in some embodiments, a pre-chill pipe may not be required or desirable.

The components of the embodiment of FIG. 10 are:

| Item | Component |
|---|---|
| 301 | Main tank |
| 302 | Refrigeration gas flow pipe (cooling pipe) |
| 303 | Inlet of refrigeration gas flow pipe (cooling pipe) |
| 304 | Outlet of refrigeration gas flow pipe (cooling pipe) |
| 305 | Main tank inner wall |
| 306 | UV lamp |
| 307 | Spiraled quartz sleeve inlet |
| 308 | Outer quartz sleeve |
| 309 | Pipe |
| 310 | Water inlet pipe to main tank |
| 311 | Water pipe to 3 way connector |
| 312 | Pipe |
| 313 | Water outlet (top) of cold water from the main tank |
| 314 | Pipe between ambient water control solenoid valve and 3 way connector |
| 315 | Spiraled quartz sleeve lower coil |
| 316 | Spiraled quartz sleeve other outlet |
| 317 | Cold water outlet pipe to faucet |
| 318 | Cold water inlet solenoid valve |
| 319 | Faucet |
| 320 | Main water inlet |
| 321 | 3 way connector |
| 322 | Water pipe to ambient water control solenoid valve |
| 323 | Ambient water control solenoid valve |
| 324 | Pipe |
| 325 | Pipe |
| 326 | Connector (fitting) |
| 327 | Water inlet pipe to main tank |
| 328 | Connector (fitting) |
| 329 | Pipe |
| 330 | Pipe |
| 331 | Connector (fitting) |

Of these, the components in the cold water flow are: 320, 321, 324, 318, 325, 326, 310, 327, 313, 312, 311, 309, 328, 329, 307, 315, 316, 330, 331, 317 and 319.

The components used for ambient flow are: 320, 321, 322, 323, 314, 311, 309, 328, 329, 307, 315, 316, 330, 331, 317 and 319.

FIGS. 17 and 18 shows embodiments which can produce chilled, ambient and sparkling water for selective dispensing of any of these, using a single tank and single UV system.

Like parts to other parts of other figures are given like reference numerals.

FIG. 17 shows the tank with the cooling pipes 4 inside, whereas FIG. 18 shows an embodiment where the cooling pipes 4 are outside.

The system shown in FIGS. 17 and 18 are in effect a combination of the systems shown in other figures, including paths for sparkling, chilled and ambient water. The ambient water passes straight into the steriliser, chilled water passes through the pre-chill and the sparkling water is produced within and dispensed from the tank. This makes ambient and cold still water at class A purification, and purified sparkling water (which passes through the UV steriliser before entry into the tank where it is carbonated).

As discussed, 'ambient' in this specification may mean 'nearly or substantially ambient' (ie not 'deliberately' cooled).

Control circuitry (PCB) 54, 154 is shown in some of the figures schematically.

The invention claimed is:

1. Water dispensing apparatus, comprising a tank and a common UV sterilising apparatus, wherein the apparatus is such that chilled water, substantially ambient temperature water and sparkling water are dispensed by the apparatus after sterilisation by the common sterilising apparatus, the apparatus comprising an input for water; a single tank provided with means for carbonating water and means for chilling water within the tank; a UV lamp; a UV transmissive coil wrapped at least partially around the lamp such that the water to be dispensed passes through the coil and is thereby sterilised by the UV lamp; and a single outlet faucet, wherein water to be dispensed as chilled water passes first into a pipe mounted within the tank and is therefore acted upon by the chilling apparatus before being passed into the single outlet faucet and sparkling water is dispensed from the tank to the single outlet faucet.

2. Water dispensing apparatus as claimed in claim 1, wherein the ambient temperature water and chilled water are sterilised to Class A standard.

3. Water dispensing apparatus as claimed in claim 1, comprising a single UV sterilising lamp used to sterilise all types of water dispensed.

4. Apparatus as claimed in claim 1, wherein the pipe into which the water passes is heat conductive.

5. Apparatus as claimed in claim 1, wherein the pipe is of stainless steel.

6. Apparatus as claimed in claim 1, wherein the UV transmissive coil is of quartz.

7. Apparatus as claimed in claim 1, wherein water to be dispensed as sparkling water passes from the pipe into the tank then to the UV transmissive coil and finally to the single faucet outlet and water which is to be dispensed as substantially ambient water is applied directly through the UV transmissive coil and from there to the single outlet faucet.

8. Apparatus as claimed in claim 1, wherein the water within the tank acts as a cooling bath.

9. Apparatus as claimed in claim 1 wherein the means for carbonating water comprises means for introducing $CO_2$ or other carbonating gas into the tank.

10. Apparatus as claimed in claim 9, including pump means for pumping water into the tank at a higher pressure than the $CO_2$ or other carbonating gas pressure.

11. Apparatus as claimed in claim 1, including a level detector.

12. Apparatus as claimed in claim 1, wherein a single UV lamp and sterilising coil are used to dispense sterilised ambient temperature water and sparkling water.

13. Water dispensing apparatus comprising a tank and a common UV sterilising apparatus, wherein the apparatus is such that both chilled water and sparkling water are dispensed by the apparatus after sterilisation by the common UV sterilising apparatus, the water dispensing apparatus comprising an input for water; a single tank provided with means for carbonating the water and means for chilling water within the tank; the common UV sterilising apparatus comprising a UV lamp and a UV transmissive coil wrapped at least partially around the lamp such that the water to be dispensed passes through the coil and is thereby sterilised by the UV lamp; and an outlet, wherein the water dispensing apparatus is arranged such that liquid to be dispensed as chilled water passes first into a pipe mounted within the tank and is therefore acted upon by the chilling apparatus before passing into the UV transmissive coil and to the outlet, and liquid which is to be dispensed as chilled water is applied directly through the UV transmissive coil to the outlet.

* * * * *